(12) United States Patent
Hu

(10) Patent No.: US 11,320,815 B2
(45) Date of Patent: May 3, 2022

(54) REMOTE CONTROL METHOD, APPARATUS, DEVICE AND COMPUTER READABLE STORAGE MEDIUM

(71) Applicant: BEIJING BAIDU NETCOM SCIENCE TECHNOLOGY CO., LTD., Beijing (CN)

(72) Inventor: Shi Hu, Beijing (CN)

(73) Assignee: APOLLO INTELLIGENT DRIVING TECHNOLOGY (BEIJING) CO., LTD., Beijing (CN)

(*) Notice: Subject to any disclaimer, the term of this patent is extended or adjusted under 35 U.S.C. 154(b) by 288 days.

(21) Appl. No.: 16/718,033

(22) Filed: Dec. 17, 2019

(65) Prior Publication Data

US 2020/0192349 A1   Jun. 18, 2020

(30) Foreign Application Priority Data

Dec. 17, 2018 (CN) .......................... 201811543815.9

(51) Int. Cl.
*H04L 29/00* (2006.01)
*G05D 1/00* (2006.01)
(Continued)

(52) U.S. Cl.
CPC .......... *G05D 1/0022* (2013.01); *H04L 67/125* (2013.01); *H04L 67/141* (2013.01); *G05D 2201/0213* (2013.01); *H04L 67/10* (2013.01)

(58) Field of Classification Search
CPC .......... G05D 1/0022; G05D 2201/0213; H04L 67/125; H04L 67/141; H04L 67/10
(Continued)

(56) References Cited

U.S. PATENT DOCUMENTS 9,671,791 B1 * 6/2017 Paczan ................ G08G 5/045
10,909,629 B1 * 2/2021 Madigan ............. G07C 5/0808
(Continued)

FOREIGN PATENT DOCUMENTS

CN    106850845 A      6/2017
CN    106856502 A  *  6/2017
(Continued)

OTHER PUBLICATIONS

Office Action of the prior Chinese application No. 201811543815.9.
Notice of Allowance of the Priority CN Application.

*Primary Examiner* — Ruolei Zong
(74) *Attorney, Agent, or Firm* — J.C. Patents

(57) ABSTRACT

The present disclosure provides a remote control method, apparatus, device and computer readable storage medium, the method including: receiving, by a cloud server, a control instruction transmitted from a third-party device, the control instruction comprising a vehicle identification and operation information; and transmitting the control instruction to an unmanned vehicle corresponding to the vehicle identification according to the vehicle identification, enabling the unmanned vehicle to act on the operation information. By establishing a communication connection between the third-party device, the unmanned vehicle and the cloud server, remote maneuvering of the unmanned vehicle can be implemented, a flexibility in controlling the unmanned vehicle improved.

13 Claims, 6 Drawing Sheets

(51) Int. Cl.
*H04L 67/125* (2022.01)
*H04L 67/141* (2022.01)
*H04L 67/10* (2022.01)

(58) Field of Classification Search
USPC .......................................................... 701/2
See application file for complete search history.

(56) References Cited

U.S. PATENT DOCUMENTS

| | | |
|---|---|---|
| 2012/0101659 A1 | 4/2012 | Kim |
| 2016/0065646 A1* | 3/2016 | Tonshal ................ H04L 67/025 701/2 |
| 2016/0116293 A1* | 4/2016 | Grover .................. G01C 21/34 701/23 |
| 2016/0285864 A1* | 9/2016 | Canavor ............. H04L 63/0823 |
| 2017/0063994 A1* | 3/2017 | Lei ...................... H04W 12/069 |
| 2019/0004510 A1* | 1/2019 | Xiao .................... G07C 5/0841 |
| 2019/0121357 A1* | 4/2019 | Zhang ................. G05D 1/0285 |
| 2019/0223237 A1* | 7/2019 | Hong .................. G05D 1/0022 |
| 2020/0026279 A1* | 1/2020 | Rhodes ............. G01C 21/3476 |
| 2020/0150653 A1* | 5/2020 | Goldman ............... H04W 12/08 |
| 2021/0174332 A1* | 6/2021 | Chen ................... G06Q 20/047 |

FOREIGN PATENT DOCUMENTS

| | | | |
|---|---|---|---|
| CN | 106856502 A | 6/2017 | |
| CN | 108263303 A | 7/2018 | |
| CN | 108657117 A | 10/2018 | |
| CN | 108989459 A | 12/2018 | |
| KR | 101631959 B1 | 6/2016 | |
| WO | WO-2017168900 A1 * | 10/2017 | ......... G01C 21/3635 |

* cited by examiner

REMOTE CONTROL METHOD, APPARATUS, DEVICE AND COMPUTER READABLE STORAGE MEDIUM

CROSS-REFERENCE TO RELATED APPLICATION

This application claims priority to Chinese Application No. CN 201811543815.9, filed on Dec. 17, 2018, which is hereby incorporated by reference in its entirety.

TECHNICAL FIELD

The present disclosure relates to the field of unmanned vehicles and, in particular, to a remote control method, an apparatus, a device and a computer readable storage medium.

BACKGROUND

The unmanned vehicle is a type of smart vehicle that perceives lane environments, plans driving routes autonomously and controls the vehicle to reach a predefined destination through an in-vehicle sensing system. It can perceive the environment around the vehicle through the in-vehicle sensing system, and control the steering and speed of the vehicle according to acquired information of lanes, vehicle positions and obstacles, so that the vehicle can drive on the road safely and reliably. Nowadays, many enterprises would choose to arrange the unmanned vehicle to perform specified actions within a specified campus. However, the unmanned vehicle typically requires a cloud server for controlling while a third-party enterprise does not have the privilege to directly exercise remote control on the unmanned vehicle. Thus, when the unmanned vehicle is required to execute unspecified actions, the unmanned vehicle needs to be operated manually, which leads to a low control efficiency of the unmanned vehicle, and consumes human resources.

SUMMARY

The present disclosure provides a remote control method, apparatus, device and computer readable storage medium, which are used for solving the problem in prior art that when a unmanned vehicle is required to execute unspecified actions, the unmanned vehicle needs to be operated manually, which leads to a low control efficiency of the unmanned vehicle and consumes human resources.

A first aspect of the present disclosure provides a remote control method, including:

receiving, by a cloud server, a control instruction transmitted from a third-party device, the control instruction comprising a vehicle identification and operation information; and transmitting the control instruction to an unmanned vehicle corresponding to the vehicle identification according to the vehicle identification, enabling the unmanned vehicle to act on the operation information.

Another aspect of the present disclosure provides a remote control apparatus, including:

a control instruction receiving module, configured for a cloud server to receive a control instruction transmitted from a third-party device, the control instruction comprising a vehicle identification and operation information; and a control instruction transmitting module, configured to transmit the control instruction to an unmanned vehicle corresponding to the vehicle identification according to the vehicle identification, enabling the unmanned vehicle to act on the operation information.

A further aspect of the present disclosure provides a remote control device, including a memory and a processor, where the memory is configured to store an instruction executable by the processor, and the processor is configured to implement the aforementioned remote control method.

A further embodiment of the present disclosure further provides a computer readable storage medium, storing thereon computer execution instructions which, when executed by a processor, implement the aforementioned remote control method.

According to the remote control method, apparatus, device and computer readable storage medium provided in the present disclosure, a control instruction transmitted from the third-party device is received through a cloud server, the control instruction including a vehicle identification and operation information; the control instruction is transmitted to an unmanned vehicle corresponding to the vehicle identification according to the vehicle identification, enabling the unmanned vehicle to act on the operation information. By establishing a communication connection between the third-party device, the unmanned vehicle and the cloud server, remote maneuvering of the unmanned vehicle can be implemented, a flexibility in controlling the unmanned vehicle is improved.

BRIEF DESCRIPTION OF DRAWINGS

To illustrate the technical solutions in the embodiments of the present disclosure or in the prior art more clearly, a brief introduction will be given below to the accompanying drawings that need to be used in describing the embodiments or the prior art. Obviously, the accompanying drawings described below are only some embodiments of the present disclosure, and other drawings can also be derived from these drawings by those of ordinary skill in the art.

DESCRIPTION OF EMBODIMENTS

In order to make the objectives, technical solutions and advantages of the embodiments of the present disclosure clearer, the technical solutions in the embodiments of the present disclosure will now be clearly and completely described in conjunction with the drawings in the embodiments of the present disclosure. Apparently, the described embodiments are only some rather than all of the embodiments of the present disclosure. All other embodiments obtained based on the embodiments of the present disclosure shall fall within the protection scope of the present disclosure.

The unmanned vehicle is a type of smart vehicle that perceives lane environments, plans driving routes autonomously and controls the vehicle to reach a predefined destination through an in-vehicle sensing system. It can perceive the environment around the vehicle through the in-vehicle sensing system, and control the steering and speed of the vehicle according to acquired information of lanes, vehicle positions and obstacles, so that the vehicle can drive on the road safely and reliably. Nowadays, many enterprises would choose to arrange the unmanned vehicle to perform specified actions within a specified campus. However, the unmanned vehicle typically requires a cloud server for controlling while a third-party enterprise does not have the privilege to directly exercise remote control on the unmanned vehicle. Thus, when the unmanned vehicle is required to execute unspecified actions, the unmanned vehicle needs to be operated manually, which leads to a low control efficiency of the unmanned vehicle, and consumes human resources. To address the above technical problems, the present disclosure provides a remote control method, apparatus, device and computer readable storage medium.

It should be explained that, the remote control method, apparatus, device and computer readable storage medium provided in the present disclosure can be used in any scenario of controlling an unmanned vehicle.

Figure 1:
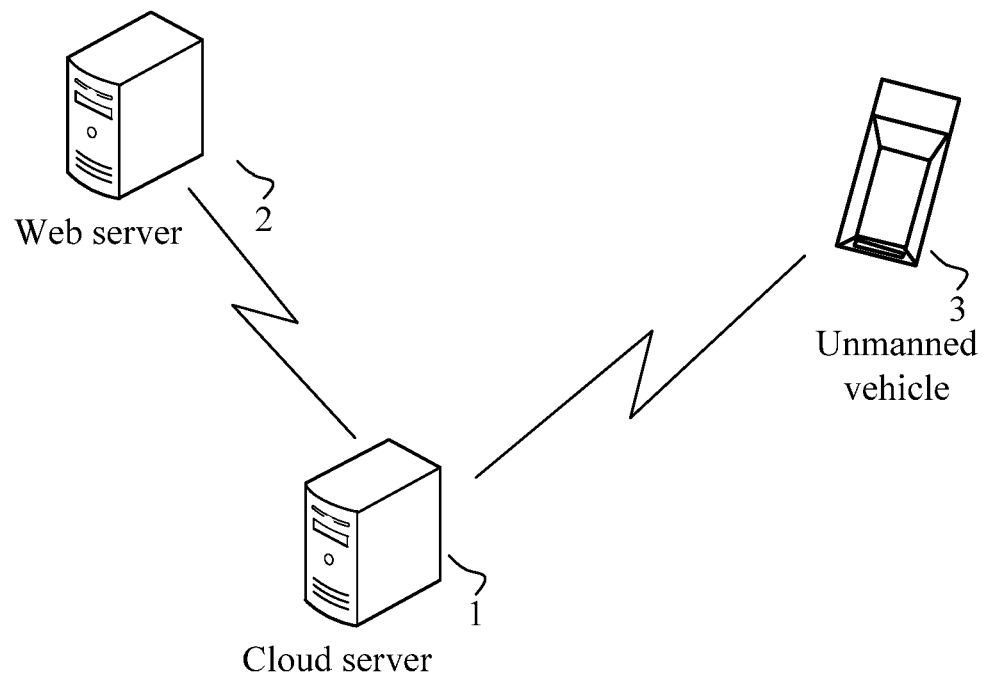
FIG. 1 is a schematic diagram of a fundamental network architecture for the present disclosure.

FIG. 1 is a schematic diagram of a fundamental network architecture for the present disclosure. As shown in FIG. 1, the network architecture according to the present disclosure at least includes: a web server 1, a cloud server 2 and an unmanned vehicle 3. The cloud server 2 is communicatively connected to the web server 1 and the unmanned vehicle 3, respectively, so that it can exchange information with the web server 1 and the unmanned vehicle 3, separately. Specifically, the cloud server 2 can receive a control instruction transmitted from the web server 1 and forward the control instruction to the unmanned vehicle 3.

Figure 2:
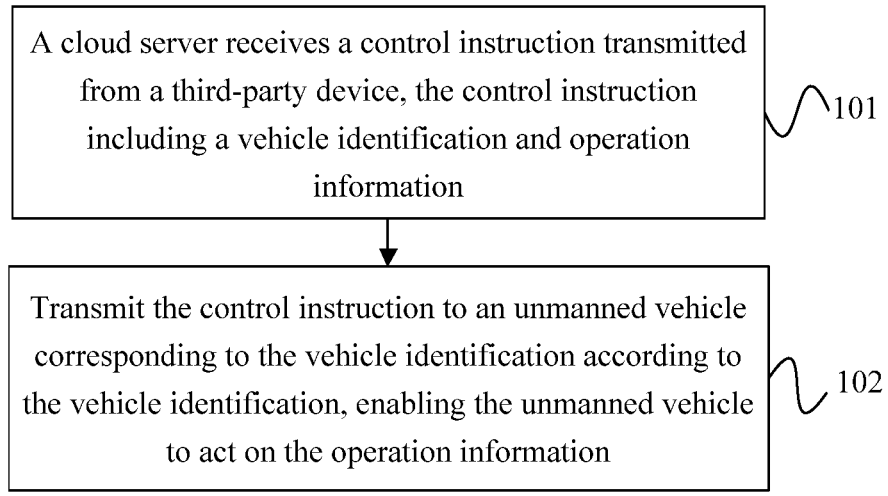
FIG. 2 is a flowchart of a remote control method provided in Embodiment 1 of the present disclosure.

FIG. 2 is a flowchart of a remote control method provided in Embodiment 1 of the present disclosure. As shown in FIG. 2, the remote control method includes:

Step 101: a cloud server receives a control instruction transmitted from a third-party device, the control instruction including a vehicle identification and operation information;

Step 102: transmit the control instruction to an unmanned vehicle corresponding to the vehicle identification according to the vehicle identification, enabling the unmanned vehicle to act on the operation information.

In this embodiment, in order to enable the third-party device to control the unmanned vehicle, the third-party device can transmit the control instruction to the cloud server as currently needed, where the control instruction includes the specific operation information that need to be acted on by the unmanned vehicle. Furthermore, as there can be more than one unmanned vehicle, the control instruction is further required to carry the vehicle identification of the intended unmanned vehicle in order to accurately target the control at that unmanned vehicle, where the vehicle identification of the unmanned vehicle can uniquely identify the unmanned vehicle. Specifically, any identification method is acceptable for implementing the identification of the unmanned vehicle, which will not be limited herein. It should be understood that, the number of vehicle identifications in the control instruction is at least one, so that a batch control can be implemented for multiple unmanned vehicles, further improving the control efficiency of the unmanned vehicles. Accordingly, the cloud server is communicatively connected to the unmanned vehicle to enable information interaction with the unmanned vehicle. The cloud server can receive a control instruction transmitted from a third-party device, where the control instruction includes operation information and a vehicle identification of an unmanned vehicle. Thus, the cloud server can transmit the control instruction to an unmanned vehicle corresponding to the vehicle identification according to the vehicle identification, enabling the unmanned vehicle to perform an operation corresponding to the operation information, hence implementing remote control to the unmanned vehicle.

According to the remote control method provided in this embodiment, a control instruction transmitted from the third-party device is received through a cloud server, the control instruction including a vehicle identification and operation information; the control instruction is transmitted to an unmanned vehicle corresponding to the vehicle identification according to the vehicle identification, enabling the unmanned vehicle to act on the operation information. By establishing a communication connection between the third-party device, the unmanned vehicle and the cloud server, remote maneuvering of the unmanned vehicle can be implemented, a flexibility in controlling the unmanned vehicle is improved.

Figure 3:
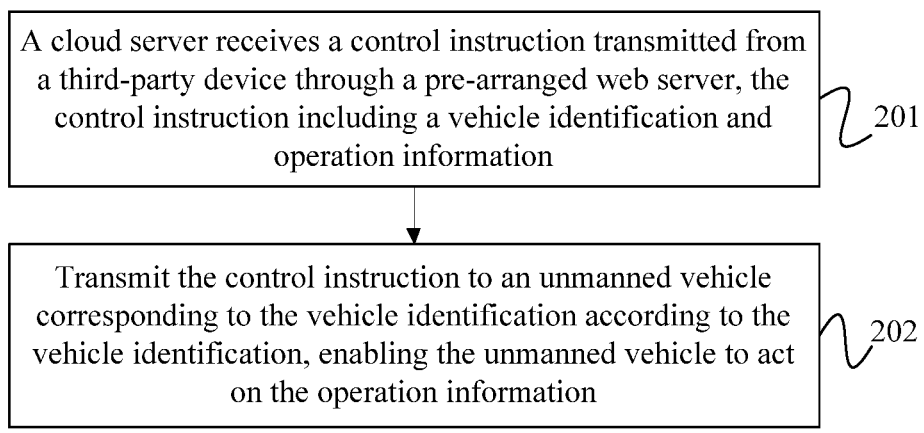
FIG. 3 is a flowchart of a remote control method provided in Embodiment 2 of the present disclosure.

FIG. 3 is a flowchart of a remote control method provided in Embodiment 2 of the present disclosure. On the basis of any one of above embodiments, as shown in FIG. 3, the method includes:

Step 201: a cloud server receives a control instruction transmitted from a third-party device through a pre-arranged web server, the control instruction including a vehicle identification and operation information;

Step 202: transmit the control instruction to an unmanned vehicle corresponding to the vehicle identification according to the vehicle identification, enabling the unmanned vehicle to act on the operation information.

This embodiment is designed on a fact in prior art that a cloud server is typically controlled by an unmanned vehicle developer. Thus, a third-party device seeking to control the unmanned vehicle has to be mounted directly in the unmanned vehicle, leading to complicated operations and consuming human resources. In order to implement the control of unmanned vehicle by the third-party device, a web server may be pre-arranged for receiving the control instruction input from the third-party device. The cloud server is communicatively connected to the web server and the unmanned vehicle, respectively, allowing for information interactions with the cloud server and the unmanned vehicle, separately. Accordingly, the third-party can input the control instruction into the web server for the web server to forward the control instruction to the cloud server. Accordingly, the cloud server can take in the control instruction transmitted from the third-party device through the web server, where the control instruction includes operation information and a vehicle identification of the unmanned vehicle, enabling the cloud server to transmit the control instruction to an unmanned vehicle corresponding to the vehicle identification according to the vehicle identification. Thus, the unmanned vehicle can perform an operation corresponding to the operation information, thereby implementing remote control to the unmanned vehicle.

According to the remote control method provided in this embodiment, control instruction transmitted from a third-party device through a pre-arranged web server is received by a cloud server, the control instruction including a vehicle identification and operation information. By establishing a communication connection among the web server, the unmanned vehicle and the cloud server, the third-party device can implement the transmission of the control instruction through the cloud server, which can, in turn, achieve remote maneuvering of the unmanned vehicle, improving a flexibility in unmanned vehicle controlling.

Furthermore, on the basis of any one of the above embodiments, the operation information includes at least one of:

controlling the unmanned vehicle to move to a specified position; controlling a lamp switch of the unmanned vehicle; controlling an air-condition temperature for the unmanned vehicle; and controlling horn blowing for the unmanned vehicle.

Accordingly, the method includes:

receiving, by a cloud server, a control instruction transmitted from a third-party device, the control instruction including a vehicle identification and operation information;

transmitting the control instruction to an unmanned vehicle corresponding to the vehicle identification according to the vehicle identification, enabling the unmanned vehicle to perform at least one of: moving to a specified position, switching on/off a vehicle lamp; adjusting an air-condition temperature; and blowing a horn.

In this embodiment, the third-party device can transmit the control instruction to an unmanned vehicle as currently needed. Specifically, the operation instruction in the control instruction includes, but is not limited to, controlling the unmanned vehicle to move to a specified position, controlling a lamp switch of the unmanned vehicle, controlling an air-conditioner temperature for the unmanned vehicle, and controlling horn blowing for the unmanned vehicle. Accordingly, after the cloud server has received the control instruction transmitted from the third-party device, it can transmit the control instruction to an unmanned vehicle corresponding to the vehicle identification according to the vehicle identification in the control instruction, enabling the unmanned vehicle to perform at least one of: moving to a specified position, switching on/off a vehicle lamp, adjusting air-conditioner temperature and blowing a horn.

According to the remote control method provided in this embodiment, a control instruction is transmitted to an unmanned vehicle corresponding to a vehicle identification according to the vehicle identification, enabling the unmanned vehicle to perform at least one of: moving to a specified position, switching on/off a vehicle lamp; adjusting air-conditioner temperature; and blowing a horn, improving the efficiency and convenience of the unmanned vehicle control.

Figure 4:
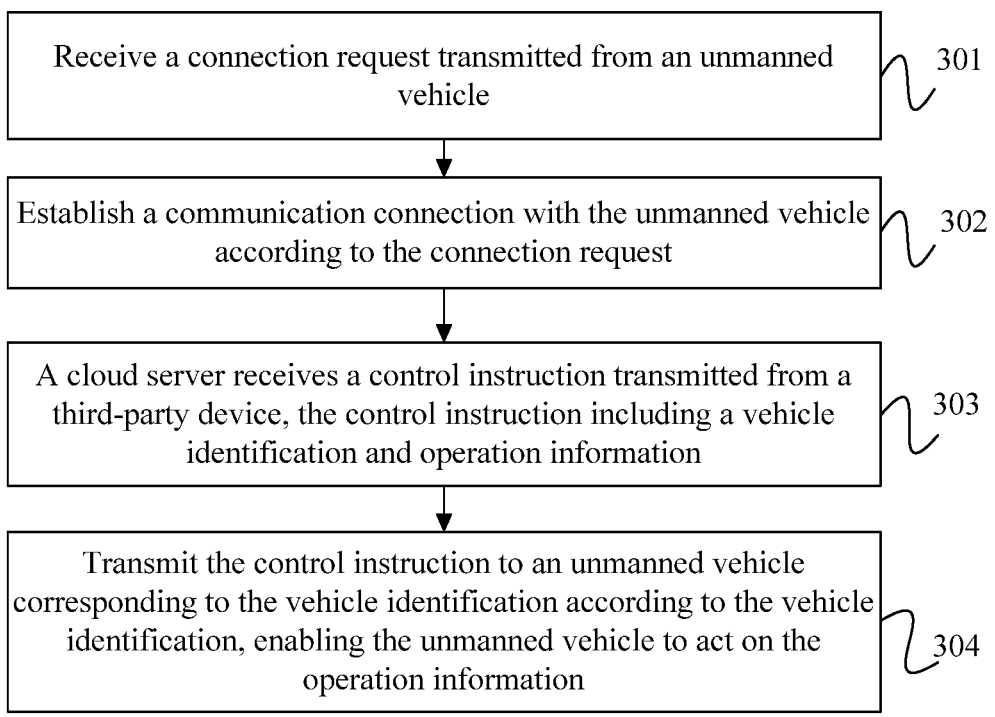
FIG. 4 is a flowchart of a remote control method provided in Embodiment 3 of the present disclosure.

FIG. 4 is a flowchart of a remote control method provided in Embodiment 3 of the present disclosure. On the basis of any one of the above embodiments, the method further includes:

Step 301: receive a connection request transmitted from an unmanned vehicle;

Step 302: establish a communication connection with the unmanned vehicle according to the connection request;

Step 303: a cloud server receives a control instruction transmitted from a third-party device, the control instruction including a vehicle identification and operation information; and Step 304: transmit the control instruction to an unmanned vehicle corresponding to the vehicle identification according to the vehicle identification, enabling the unmanned vehicle to act on the operation information.

It can be understood that, to implement the information interaction between the cloud server and the unmanned vehicle, the communication connection between the cloud server and the unmanned vehicle should be firstly built. Specifically, the unmanned vehicle can transmit a connection request to the cloud server. Accordingly, the cloud server can receive the connection request transmitted from the unmanned vehicle, and establish a communication connection with the unmanned vehicle according to the connection request. As an achievable method, when a new unmanned vehicle is added, the cloud server can transmit a connection request to the unmanned vehicle, enabling the unmanned vehicle to establish a communication connection with the cloud server according to the connection request. When the cloud server has established a communication connection with the unmanned vehicle, the information interaction can be implemented. Therefore, the cloud server can receive a control instruction transmitted from a third-party device, and transmits operation information to an unmanned vehicle corresponding to the vehicle identification according to the vehicle identification in the control instruction, enabling the unmanned vehicle to perform an operation corresponding to the operation information.

According to the remote control method provided in this embodiment, a connection request transmitted from an unmanned vehicle is received, and a communication connection with the unmanned vehicle is established according to the connection request. Thus, an information interaction between the cloud server and the unmanned vehicle can be implemented, and remote controlling of the unmanned vehicle can, in turn, be implemented, therefore, a flexibility of unmanned vehicle control is improved.

Furthermore, on the basis of any one of the above embodiments, the connection request includes vehicle identification, and the method further includes:

receiving a connection request transmitted from an unmanned vehicle;

establishing a communication connection with the unmanned vehicle according to the connection request;

determining an vehicle identification of the unmanned vehicle, and storing the vehicle identification in association with a connection;

receiving, by a cloud server, a control instruction transmitted from a third-party device, the control instruction including a vehicle identification and operation information;

transmitting the control instruction to an unmanned vehicle corresponding to the vehicle identification according to the vehicle identification, enabling the unmanned vehicle to act on the operation information.

In this embodiment, since there are more than one unmanned vehicle engaging in communicative connections with the cloud server, it is necessary to determine the vehicle identification of the unmanned vehicle in the process of establishing a communication connection for the unmanned vehicle in order to enable the control instruction to be accurately transmitted. Correspondingly, the connection request transmitted by the unmanned vehicle includes the vehicle identification of the unmanned vehicle. Therefore, after receiving the connection request and establishing the communication connection with the unmanned vehicle according to the connection request, the cloud server will be able to determine the vehicle identification of the unmanned vehicle, store the current communication connection in association with the vehicle identification of the unmanned vehicle. Thus, after further control instructions are subsequently received, the cloud server can determine whether the cloud server has previously established any communication connection with the unmanned vehicle.

According to the remote control method provided in this embodiment, a vehicle identification of an unmanned vehicle is identified and stored in association with a connection, providing a basis for the transmission of further control instructions.

Figure 5:
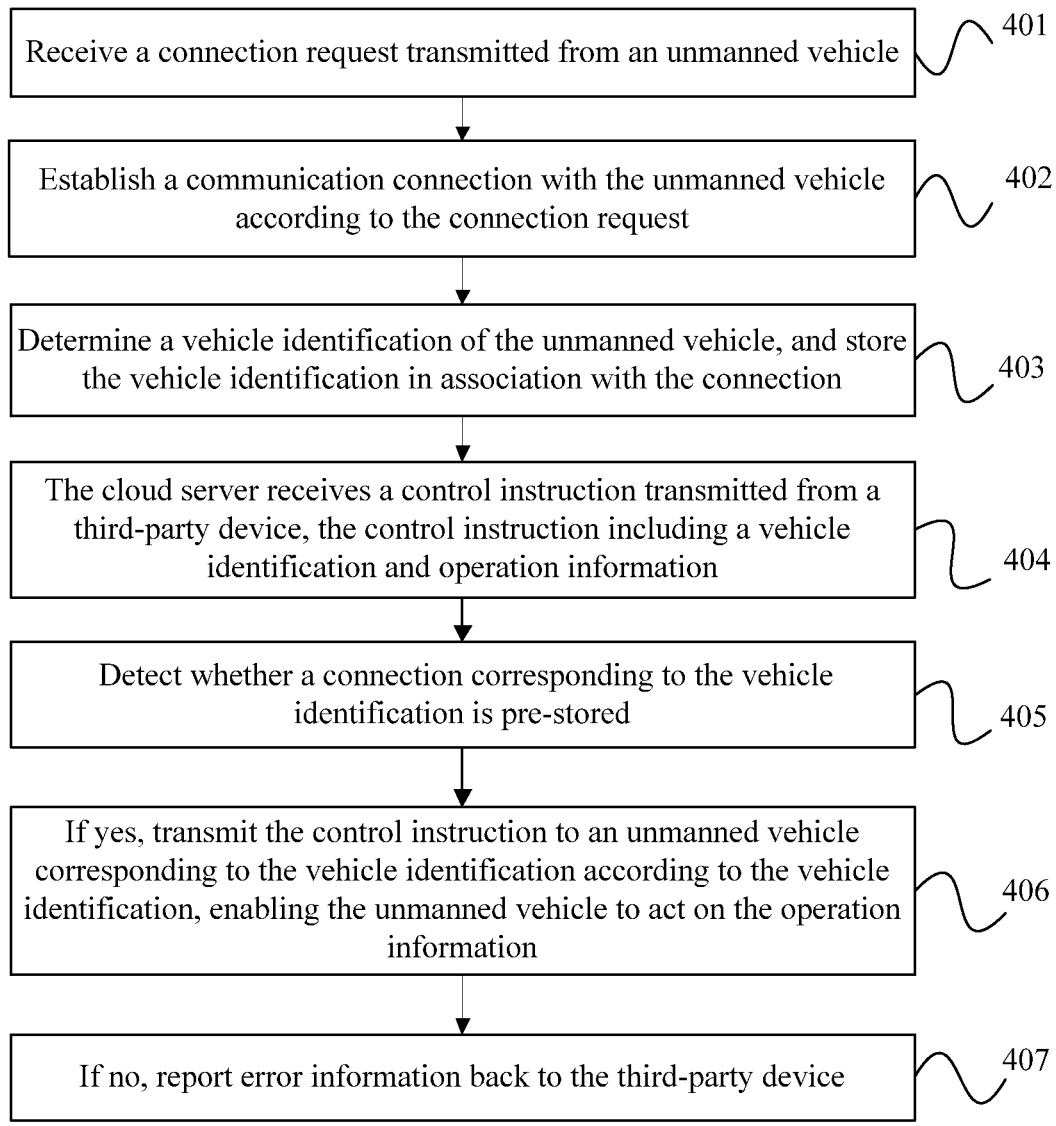
FIG. 5 is a flowchart of a remote control method provided in Embodiment 4 of the present disclosure.

FIG. 5 is a flowchart of a remote control method provided in Embodiment 4 of the present disclosure. On the basis of any one of the above embodiments, the method includes:

Step 401: receive a connection request transmitted from an unmanned vehicle;

Step 402: establish a communication connection with the unmanned vehicle according to the connection request;

Step 403: determine a vehicle identification of the unmanned vehicle, and store the vehicle identification in association with the connection;

Step 404: the cloud server receives a control instruction transmitted from a third-party device, the control instruction including a vehicle identification and operation information;

Step 405: detect whether a connection corresponding to the vehicle identification is pre-stored;

Step 406: if yes, transmit the control instruction to an unmanned vehicle corresponding to the vehicle identification according to the vehicle identification, enabling the unmanned vehicle to act on the operation information;

Step 407: if no, report error information back to the third-party device.

It can be understood that the cloud server can forward the received control instruction to an unmanned vehicle only after it has established a communication connection with the unmanned vehicle. Without the communication connection between the two, the forwarding of the control instruction cannot be implemented. Therefore, after receiving the control instruction transmitted from the third-party device, it is first determined whether any connection corresponding to the vehicle identification is pre-stored in the cloud server according to the vehicle identification in the control instruction. If yes, the control instruction can be forwarded to the vehicle corresponding to the vehicle identification based on the vehicle identification. Correspondingly, if no connection corresponding to the vehicle identification is stored, indicating that no connection is established between the unmanned vehicle and the cloud server, and in this case, the control instruction cannot be forwarded to the unmanned vehicle. Thus, error information can be transmitted to the third-party device, where the error information includes the control instruction that is not successfully transmitted, so that the user can perform corresponding handling after viewing the error reminder on the third-party device. For example, the user may control the unmanned vehicle to transmit a connection request to the cloud server, and then remotely control the unmanned vehicle after establishing the connection.

According to the remote control method provided by this embodiment, a detection is performed to find out whether any connection corresponding to a vehicle identification is pre-stored and, if yes, a control instruction is transmitted to an unmanned vehicle corresponding to the vehicle identification according to the vehicle identification, enabling the unmanned vehicle to act on the operation information; if not, error information is reported back to a third-party device. Thus, on the basis of implementing control instruction forwarding, error information can be transmitted to the third-party device for control instructions that have failed to be forwarded, enabling the user to perform proper handling after seeing the error reminder on the third-party device, thereby achieving effective control of the unmanned vehicle.

Figure 6:
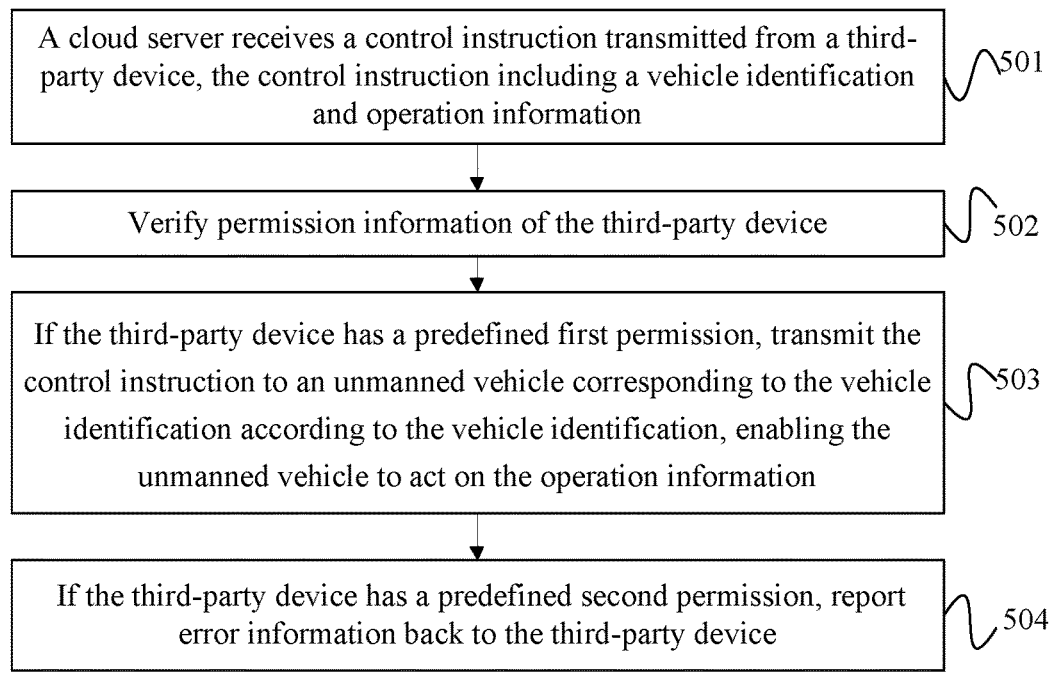
FIG. 6 is a flowchart of a remote control method provided in Embodiment 5 of the present disclosure.

FIG. 6 is a flowchart of a remote control method provided in Embodiment 5 of the present disclosure. On the basis of any one of the above embodiments, as shown in FIG. 6, the method further includes:

Step 501: a cloud server receives a control instruction transmitted from a third-party device, the control instruction including a vehicle identification and operation information;

Step 502: verify permission information of the third-party device;

Step 503: if the third-party device has a predefined first permission, transmit the control instruction to an unmanned vehicle corresponding to the vehicle identification according to the vehicle identification, enabling the unmanned vehicle to act on the operation information; and Step 504: if the third-party device has a predefined second permission, report error information back to the third-party device.

In this embodiment, in order to ensure the security for the unmanned vehicle, it is necessary to ensure that the third-party device that transmits the control instruction to an unmanned vehicle has the necessary permission. Specifically, after receiving a control instruction transmitted from a third-party device, the cloud server needs to verify the permission information of the third-party device. The authentication for the third-party device may be implemented by using any permission verification method, e.g., a security question, a fingerprint verification, a password verification and the like, which will not be limited herein. Correspondingly, if the third-party device has the predefined first permission, the control instruction may be transmitted to the unmanned vehicle corresponding to the vehicle identification according to the vehicle identification, enabling the unmanned vehicle to act on the operation information, where the first permission indicates that the third-party device has the permission to control the unmanned vehicle. If the third-party device has the predefined second permission, error information is reported back to the third-party device, where the second permission indicates that the third-party device does not have the permission to control the unmanned vehicle. In this case, in order to ensure the security for the unmanned vehicle, the unmanned vehicle may not be controlled according to the control instruction transmitted from the third device.

According to the remote control method provided by this embodiment, permission information of the third-party device is verify and, if the third-party device has a predefined first permission, the control instruction is transmitted to the vehicle corresponding to the vehicle identification according to the vehicle identification, enabling the unmanned vehicle to act on the operation information, if the third-party device has a predefined second permission, error information is reported back to the third-party device, so that the security of the unmanned vehicle is guaranteed on the basis of allowing for remote control of the unmanned vehicle.

Figure 7:
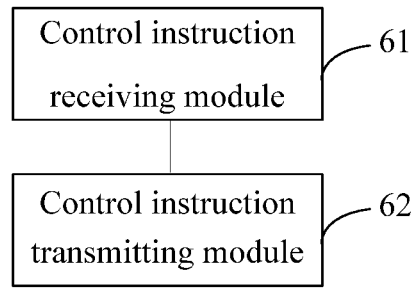
FIG. 7 is a schematic diagram of a remote control apparatus provided in Embodiment 6 of the present disclosure.

FIG. 7 is a schematic diagram of a remote control apparatus provided in Embodiment 6 of the present disclosure. On the basis of the above embodiments, as shown in FIG. 7, the remote control apparatus includes:

a control instruction receiving module 61, configured for a cloud server to receive a control instruction transmitted from a third-party device, the control instruction including a vehicle identification and operation information; and a control instruction transmitting module 62, configured to transmit the control instruction to an unmanned vehicle corresponding to the vehicle identification according to the vehicle identification, enabling the unmanned vehicle to act on the operation information.

In this embodiment, in order to enable the third-party device to control the unmanned vehicle, the third-party device can transmit the control instruction to the cloud server as currently need, where the control instruction includes the specific operation information that need to be acted on by the unmanned vehicle. Furthermore, as there can be more than one unmanned vehicle, the control instruction is further required to carry the vehicle identification of the intended unmanned vehicle in order to accurately target the control at that unmanned vehicle, where the vehicle identification of the unmanned vehicle can uniquely identify the unmanned vehicle. Specifically, any identification method is acceptable for implementing the identification of the unmanned vehicle, which will not be limited herein. It should be understood that, the number of vehicle identifications in the control instruction is at least one, so that a batch control can be implemented for multiple unmanned vehicles, further improving the control efficiency of the unmanned vehicles. Accordingly, the cloud server is communicatively connected to the unmanned vehicle to enable information interaction with the unmanned vehicle. The cloud server can receive a control instruction transmitted from a third-party device, where the control instruction includes operation information and a vehicle identification of an unmanned vehicle. Thus, the cloud server can transmit the control instruction to the unmanned vehicle corresponding to the vehicle identification according to the vehicle identification, enabling the unmanned vehicle to perform an operation corresponding to the operation information, hence implementing remote control to the unmanned vehicle.

According to the remote control apparatus provided in this embodiment, a control instruction transmitted from the third-party device is received through a cloud server, the control instruction including a vehicle identification and operation information; the control instruction is transmitted to an unmanned vehicle corresponding to the vehicle identification according to the vehicle identification, enabling the unmanned vehicle to act on the operation information. By establishing a communication connection between the third-party device, the unmanned vehicle and the cloud server, remote maneuvering of the unmanned vehicle can be implemented, a flexibility in controlling the unmanned vehicle is improved.

Furthermore, on the basis of any one of the above embodiments, the control instruction receiving module includes:

a receiving unit, configured for a cloud server to receive a control instruction transmitted from a third-party device through a pre-arranged web server.

Furthermore, on the basis of any one of the above embodiments, the operation information includes at least one of:

controlling the unmanned vehicle to move to a specified position; controlling a lamp switch of the unmanned vehicle; controlling an air-condition temperature for the unmanned vehicle; and controlling horn blowing for the unmanned vehicle; and correspondingly, the control instruction transmitting module includes:

a control unit, configured to transmit the control instruction to the unmanned vehicle corresponding to the vehicle identification according to the vehicle identification, enabling the unmanned vehicle to perform at least one of:

moving to the specified position, switching on/off a vehicle lamp, adjusting the air-condition temperature, and blowing a horn.

Furthermore, on the basis of any one of the above embodiments, the apparatus also includes at least one of:

a connection request receiving module, configured to receive a connection request transmitted from the unmanned vehicle; and a connecting module, configured to establish a communication connection with the unmanned vehicle according to the connection request.

Furthermore, on the basis of any one of the above embodiments, the connection request includes vehicle identification, and correspondingly, the apparatus further includes:

a storing module, configured to determine the vehicle identification of the unmanned vehicle, and store the vehicle identification in association with the connection.

Furthermore, on the basis of any one of the above embodiments, the control instruction transmitting module includes:

a detecting module, configured to detect whether a connection corresponding to the vehicle identification is pre-stored;

a first processing module, configured to, if yes, transmit the control instruction to the unmanned vehicle corresponding to the vehicle identification according to the vehicle identification; and a second processing module, configured to, if no, report error information back to the third-party device.

Furthermore, on the basis of any one of the above embodiments, the apparatus also includes at least one of:

an authenticating module, configured to verify permission information of the third-party device;

a third processing module, configured to, if the third-party device has a predefined first permission, transmit the control instruction to the unmanned vehicle corresponding to the vehicle identification according to the vehicle identification, enabling the unmanned vehicle to act on the operation information; and a forth processing module, configured to, if the third-party device has a predefined second permission, report error information back to the third-party device.

Figure 8:
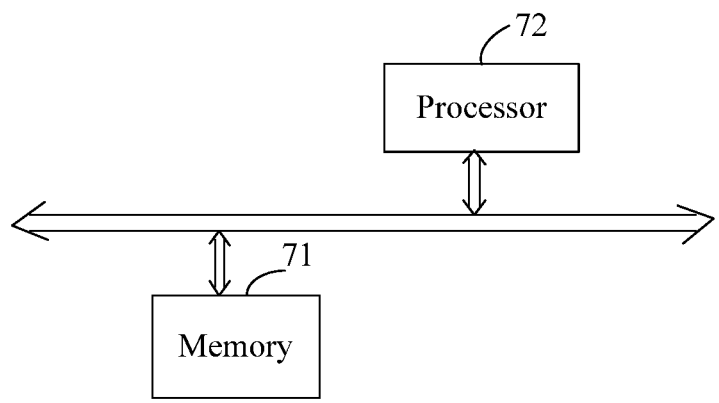
FIG. 8 is a schematic diagram of a remote control device provided in Embodiment 7 of the present disclosure.

FIG. 8 is a schematic diagram of a remote control device provided in Embodiment 7 of the present disclosure. As shown in FIG. 8, the remote control device includes: a memory 71, and a processor 72, where the memory 71 is configured to store an instruction executable by the processor 72, and the processor 72 is configured to implement the remote control method according to any one of the above embodiments.

Another embodiment of the present disclosure provides a computer readable storage medium, storing thereon computer execution instructions which, when executed by a processor, implement the remote control method according to any one of the above embodiments.

Those skilled in the art may clearly appreciate that, for the purpose of convenience and brevity in the description, the specific operating process of the apparatuses as described hereinabove may be understood by referring to the corresponding processes in the foregoing method embodiments, which will not be repeated herein.

It will be understood by those skilled in the art that all or part of the steps of the foregoing method embodiments may be implemented by a hardware in relation to program instructions. The program may be stored in a computer readable storage medium. The program, when executed, executes steps incorporating the foregoing method embodiments, and the foregoing storage medium includes various media that can store program codes, such as a ROM, a RAM, a magnetic disk, or an optical disk.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A remote control method, comprising:
   receiving, by a cloud server, a control instruction transmitted from a third-party device through a pre-arranged web server, the control instruction comprising a vehicle identification and operation information, wherein the pre-arranged web server is configured to build an information interaction between the cloud server and the third-party device, and the third-party device cannot access the cloud server directly; and
   transmitting the control instruction to an unmanned vehicle corresponding to the vehicle identification according to the vehicle identification, enabling the unmanned vehicle to act on the operation information.

2. The method according to claim 1, wherein the operation information comprises at least one of: controlling the unmanned vehicle to move to a specified position; controlling a lamp switch of the unmanned vehicle; controlling an air-condition temperature for the unmanned vehicle; and controlling horn blowing for the unmanned vehicle; and
   correspondingly, the transmitting the control instruction to an unmanned vehicle corresponding to the vehicle identification according to the vehicle identification, enabling the unmanned vehicle to act on the operation information comprises:
   transmitting the control instruction to the unmanned vehicle corresponding to the vehicle identification according to the vehicle identification, enabling the unmanned vehicle to perform at least one of: moving to the specified position, switching on/off a vehicle lamp, adjusting the air-condition temperature, and blowing a horn.

3. The method according to claim 1, wherein before the receiving, by a cloud server, a control instruction, transmitted from a third-party device, the method further comprises:
   receiving a connection request transmitted from the unmanned vehicle; and
   establishing a communication connection with the unmanned vehicle according to the connection request.

4. The method according to claim 3, wherein the connection request comprises a vehicle identification; and
   correspondingly, after the establishing a communication connection with the unmanned vehicle according to the connection request, the method further comprises:
   determining the vehicle identification of the unmanned vehicle, and storing the vehicle identification in association with a connection.

5. The method according to claim 3, wherein the transmitting the control instruction to an unmanned vehicle corresponding to the vehicle identification according to the vehicle identification comprises:
   detecting whether a connection corresponding to the vehicle identification is pre-stored and,
   if yes, transmitting the control instruction to the unmanned vehicle corresponding to the vehicle identification according to the vehicle identification; and
   if no, reporting error information back to the third-party device.

6. The method according to claim 1, wherein after the receiving, by a cloud server, a control instruction, transmitted from a third-party device, the method further comprises:
   verifying permission information of the third-party device and;
   if the third-party device has a predefined first permission, transmitting the control instruction to the unmanned vehicle corresponding to the vehicle identification according to the vehicle identification, enabling the unmanned vehicle to act on the operation information; and
   if the third-party device has a predefined second permission, reporting error information back to the third-party device.

7. A system, comprising:
   a memory and a processor;
   wherein the memory is configured to store instructions executable by the processor, and the processor is configured to execute the instructions to:
   receive a control instruction transmitted from a third-party device through a pre-arranged web server, the control instruction comprising a vehicle identification and operation information, wherein the pre-arranged web server is configured to build an information interaction between the cloud server and the third-party device, wherein the third-party device cannot access the cloud server directly; and
   transmit the control instruction to an unmanned vehicle corresponding to the vehicle identification according to the vehicle identification, enabling the unmanned vehicle to act on the operation information.

8. The system according to claim 7, wherein the operation information comprises at least one of: controlling the unmanned vehicle to move to a specified position; controlling a lamp switch of the unmanned vehicle; controlling an air-condition temperature for the unmanned vehicle; and controlling horn blowing for the unmanned vehicle; and
   correspondingly, the processor is configured to execute the instructions to:
   transmit the control instruction to the unmanned vehicle corresponding to the vehicle identification according to the vehicle identification, enabling the unmanned vehicle to perform at least one of: moving to the specified position, switching on/off a vehicle lamp, adjusting the air-condition temperature, and blowing a horn.

9. The system according to claim 7, wherein the processor is configured to execute the instructions to:
   receive a connection request transmitted from the unmanned vehicle; and
   establish a communication connection with the unmanned vehicle according to the connection request.

10. The system according to claim 9, wherein the connection request comprises a vehicle identification; and
    correspondingly, the processor is configured to execute the instructions to:

determine the vehicle identification of the unmanned vehicle, and store the vehicle identification in association with the connection.

11. The system according to claim 9, wherein the processor is configured to execute the instructions to:
   detect whether a connection corresponding to the vehicle identification is pre-stored;
   if yes, transmit the control instruction to the unmanned vehicle corresponding to the vehicle identification according to the vehicle identification; and
   if no, report error information back to the third-party device.

12. The system according to claim 7, wherein the processor is configured to execute the instructions to:
   verify permission information of the third-party device;
   if the third-party device has a predefined first permission, transmit the control instruction to an unmanned vehicle corresponding to the vehicle identification according to the vehicle identification, enabling the unmanned vehicle to act on the operation information; and
   if the third-party device has a predefined second permission, report error information back to the third-party device.

13. A non-volatile storage medium, storing thereon computer execution instructions which, when executed by a processor, implement the remote control method according to claim 1.

\* \* \* \* \*